(12) United States Patent
Compton et al.

(10) Patent No.: US 8,560,399 B2
(45) Date of Patent: Oct. 15, 2013

(54) SCHEDULED REPETITIVE SEARCH

(75) Inventors: David Compton, Ventura, CA (US);
Steven Markowitz, Ventura, CA (US)

(73) Assignee: Netplenish, Inc., Ventura, CA (US)

( * ) Notice: Subject to any disclaimer, the term of this patent is extended or adjusted under 35 U.S.C. 154(b) by 0 days.

(21) Appl. No.: 12/955,385

(22) Filed: Nov. 29, 2010

(65) Prior Publication Data

US 2011/0131113 A1      Jun. 2, 2011

Related U.S. Application Data

(60) Provisional application No. 61/265,192, filed on Nov. 30, 2009.

(51) Int. Cl.
*G06Q 30/00*      (2012.01)

(52) U.S. Cl.
USPC ........................... 705/26.64; 705/14.39

(58) Field of Classification Search
USPC ............... 705/26.1, 27.1, 26.8, 26.81, 26.41
See application file for complete search history.

(56) References Cited

U.S. PATENT DOCUMENTS

| | | | | |
|---|---|---|---|---|
| 4,992,940 A | * | 2/1991 | Dworkin | 705/26.8 |
| 7,353,194 B1 | * | 4/2008 | Kerker et al. | 705/29 |
| 7,797,196 B1 | * | 9/2010 | Aaron et al. | 705/26.1 |
| 7,953,645 B2 | * | 5/2011 | Kerker et al. | 705/26.1 |
| 2004/0236639 A1 | * | 11/2004 | Candadai et al. | 705/27 |
| 2004/0254854 A1 | | 12/2004 | Lin et al. | |
| 2006/0059062 A1 | * | 3/2006 | Wood et al. | 705/35 |
| 2007/0271147 A1 | * | 11/2007 | Crespo et al. | 705/26 |

FOREIGN PATENT DOCUMENTS

| | | |
|---|---|---|
| KR | 10-2002-0088700 A | 11/2002 |
| KR | 10-2005-0077567 A | 8/2005 |
| KR | 10-0732480 B1 | 6/2007 |

OTHER PUBLICATIONS

M2 Presswire, "Amazon introduces price comparison app for iPhone". M2 Presswire [Coventry] Nov. 22, 2010.*
Anonymous, Website focus: www.tradeout.com, Apr. 2000.*

* cited by examiner

*Primary Examiner* — Mark Fadok
(74) *Attorney, Agent, or Firm* — Quarles & Brady LLP

(57) ABSTRACT

A host computing device conducts scheduled repetitive searches for a resource to be purchased and delivery according to a specified delivery schedule. A customer provides the host with a description of the resource and provides a specified delivery schedule. The host computing device conducts automated scheduled repetitive searches for the resource, selects a vendor offering the resource based on a criterion (e.g., lowest price), and conducts the respective purchases such that the resources are delivered in accordance with the specified delivery schedule. Here, the resource may be purchased from a first vendor in a first purchase and a second, different vendor in a subsequent second purchase for the resource.

5 Claims, 12 Drawing Sheets

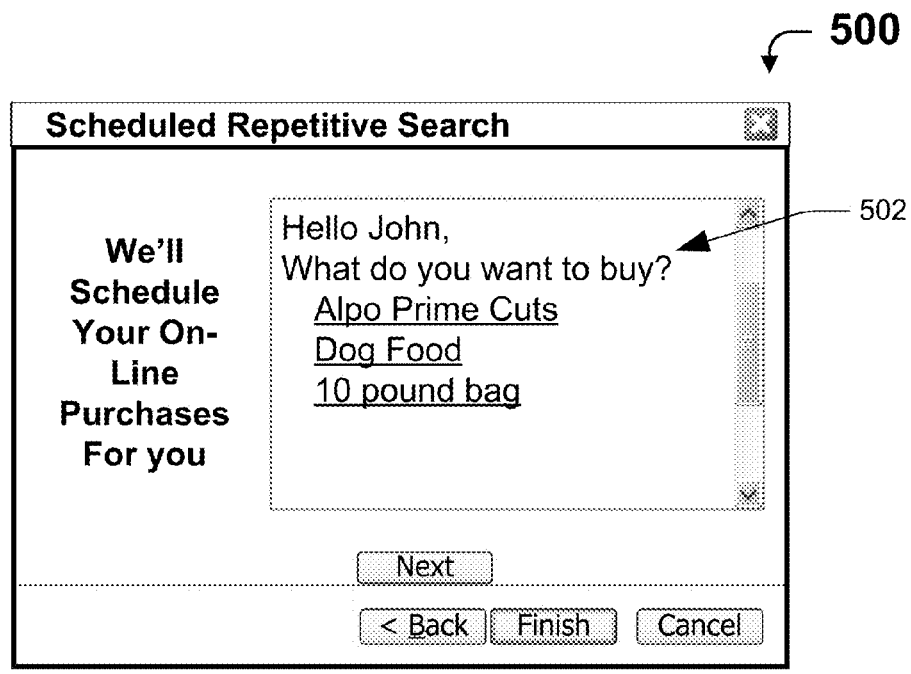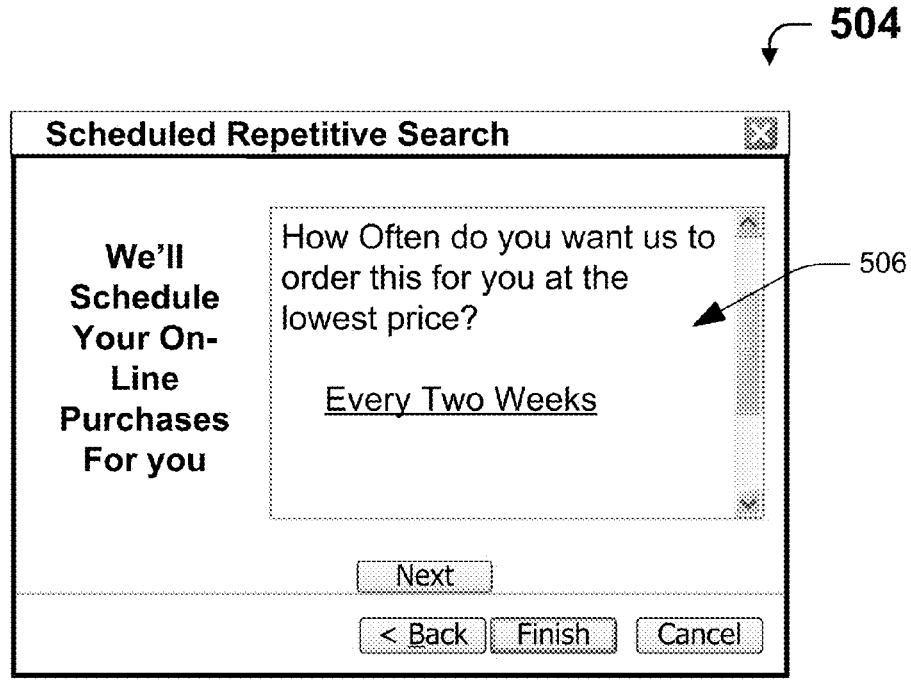
Figure 5

| First Time | | | | | | |
|---|---|---|---|---|---|---|
| Products Available | DrugStore.com | Buy.com | Vitaminemporium.com | Walgreens | Diapers.com | Kmart | Overstock.com |
| | (7) | (1) | (19) | (2) | (25) | (14) | (34) |
| Huggies Little Swimmers Swim Diapers, Small (133717) | 9.99x1 | 8.26x1 | | 9.99x1 | 8.29x1 | 7.99x1 | |
| Schick Sensitive Triple Disposable Razors for Him (189905) | 7.99x1 | 6.58x1 | 7.99x1 | | | | 20.19x1 |
| Centrum Ultra Women's Multivitamin/Multimineral Supplement Tablets (1214575) | 11.99x1 | 10.95x1 | 10.99x1 | 9.99x1 | | 6.95 | |
| Quantity | 3 | 3 | 2 | 2 | 1 | 1 | 1 |
| Sub Totals | 29.97 | 25.79 | 18.98 | 19.93 | 8.29 | 7.99 | 20.19 |
| Shipping | 5.99 | 12 | 4.95 | 5.49 | 0 | 6.95 | 2.95 |
| Total | 35.96 | 37.79 | 23.93 | 25.47 | 8.29 | 14.94 | 23.14 |

Non Bundled Total - $41
Bundled Total - $35.96

1108

| Products to Order | Merchant | Price |
|---|---|---|
| Huggies Little Swimmers Disposable Swimpants, Unisex, Small, 15-25 lbs | DrugStore.com | 9.99 |
| Schick Sensitive Triple Disposable Razors for Him | DrugStore.com | 7.99 |
| Centrum Ultra Women's Multivitamin/Multimineral Supplement Tablets | DrugStore.com | 11.99 |
| Totals | 3 | 35.96 |

Figure 12

SCHEDULED REPETITIVE SEARCH

CROSS-REFERENCE TO RELATED APPLICATIONS

This application claims priority to, and the benefit of, U.S. Application Ser. No. 61/265,192, filed on Nov. 30, 2009, titled "Scheduled Repetitive Search," the entire contents of which is incorporated herein by reference.

BACKGROUND

Customers, such as household consumers and business operators, typically have certain resources (e.g., goods or services) that they purchase on a routine basis. A household consumer may purchase dog food or toilet paper on a routine basis while a business operator may purchase paper or a printer toner on a routine basis. Sometimes it is difficult for the customer to time his next purchase to replenish the resource so that the customer is not left without the resource. For example, if the household consumer runs out of the dog food, the consumer may have to run to a supermarket to purchase another bag of dog food in time to feed the dog. In some instances, the purchase cannot be done at the last minute and the customer is left without the resource when the customer needs it most.

Additionally, not only can running out be a problem, but many of these resources can have retail purchase stigmas when bought at traditional supermarkets or drugstores. A recent study has shown that household consumers find tampons to be the number two most embarrassing resource to purchase. The retail purchase stigma may be decreased by conducting an on-line purchase. For example, the household consumer may go on-line to a website of a vendor (e.g., merchant, retailer, or manufacturer), put the tampons in an electronic shopping cart, and use the vendor's electronic check-out process to purchase the item. The vendor may then ship the tampons to the household consumer's address provided during the on-line purchase. Here, however, the household consumer must manually go on-line each time to make another purchase of the tampons.

Accordingly, it would be an advance in the art of commerce to provide solutions for convenient and efficient repetitive purchases of resources.

FIELD

The present invention generally relates to automatically and/or autonomically conducting scheduled repetitive searches for resources and more particularly to conducting scheduled repetitive searches for resources for a subsequent purchase.

COPYRIGHT

Contained herein are materials subject to copyright protection. The copyright owner has no objection to the facsimile reproduction of the patent disclosure by any person as it appears in the Patent and Trademark Office patent files or records, but otherwise reserves all rights to the copyright whatsoever.

SUMMARY

In one implementation, a resource is autonomically purchased from a plurality of vendors in accord with a specified delivery schedule. Initially, a customer sends data identifying a resource that the customer desires delivered on a specified delivery schedule and a vendor selection criterion. A first vendor is selected using the vendor selection criterion and the resource is purchased from the first vendor for delivery by a first specified date without further communication with the customer. A second, different vendor is selected using the vendor selection criterion and the resource is purchased from the second vendor for delivery by a second specified date without further communication with the customer. The second specified date is subsequent to the first specified date and determined from the specified delivery schedule and first specified date.

In another implementation, a resource is autonomically purchased from a plurality of vendors in accord with a specified delivery schedule. Initially, a customer sends data identifying a resource that the customer desires delivered on a specified delivery schedule, a vendor selection criterion, and consent of the customer to conduct, on behalf of the customer, a plurality of purchases for the resource from a plurality of vendors. A first vendor is selected using the vendor selection criterion and the resource is purchased from the first vendor for delivery a specified address by a first specified date recited in the specified delivery schedule, without receiving further consent of the customer to conduct the purchase from the first vendor. An actual delivery date of the resource is received and used, in conjunction with the specified delivery schedule, to determine a second delivery date. Prior to the second delivery date, the host computing device selects a second, different vendor using the vendor selection criterion and purchases the resource from the second vendor for delivery by the second specified date without receiving further consent of the customer to conduct the purchase from the second vendor.

In yet another implementation, a resource is autonomically purchased from a plurality of vendors in accord with a specified delivery schedule. Initially, a customer sends data identifying a plurality of resources that the customer desires delivered on a specified delivery schedule, a vendor selection criterion, and consent of the customer to conduct, on behalf of the customer, a plurality of purchases for the resources from a plurality of vendors. A first vendor is selected using the vendor selection criterion and the resources are purchased from the first vendor for delivery by corresponding first specified dates, without receiving further consent of the customer to conduct the purchase from the first vendor. A second, different vendor is selected using the vendor selection criterion and the resources are purchased from the second vendor for delivery by corresponding second specified dates without receiving further consent of the customer to conduct the purchase from the first vendor. The second specified date is subsequent to the first specified date and determined from the specified delivery schedule and corresponding first specified dates that were recited in the specified delivery schedule.

BRIEF DESCRIPTION OF THE DRAWINGS

Implementations of the invention will become more apparent from the detailed description set forth below when taken in conjunction with the drawings, in which like elements bear like reference numerals.

FIG. 5 illustrates user interfaces rendered on a customer computing device in the system depicted in FIG. 1;

FIG. 11 illustrates another user interface rendered on a customer computing device in the system depicted in FIG. 1; and FIG. 12 illustrates yet another user interface rendered on a customer computing device in the system depicted in FIG. 1.

DETAILED DESCRIPTION

Figure 1:
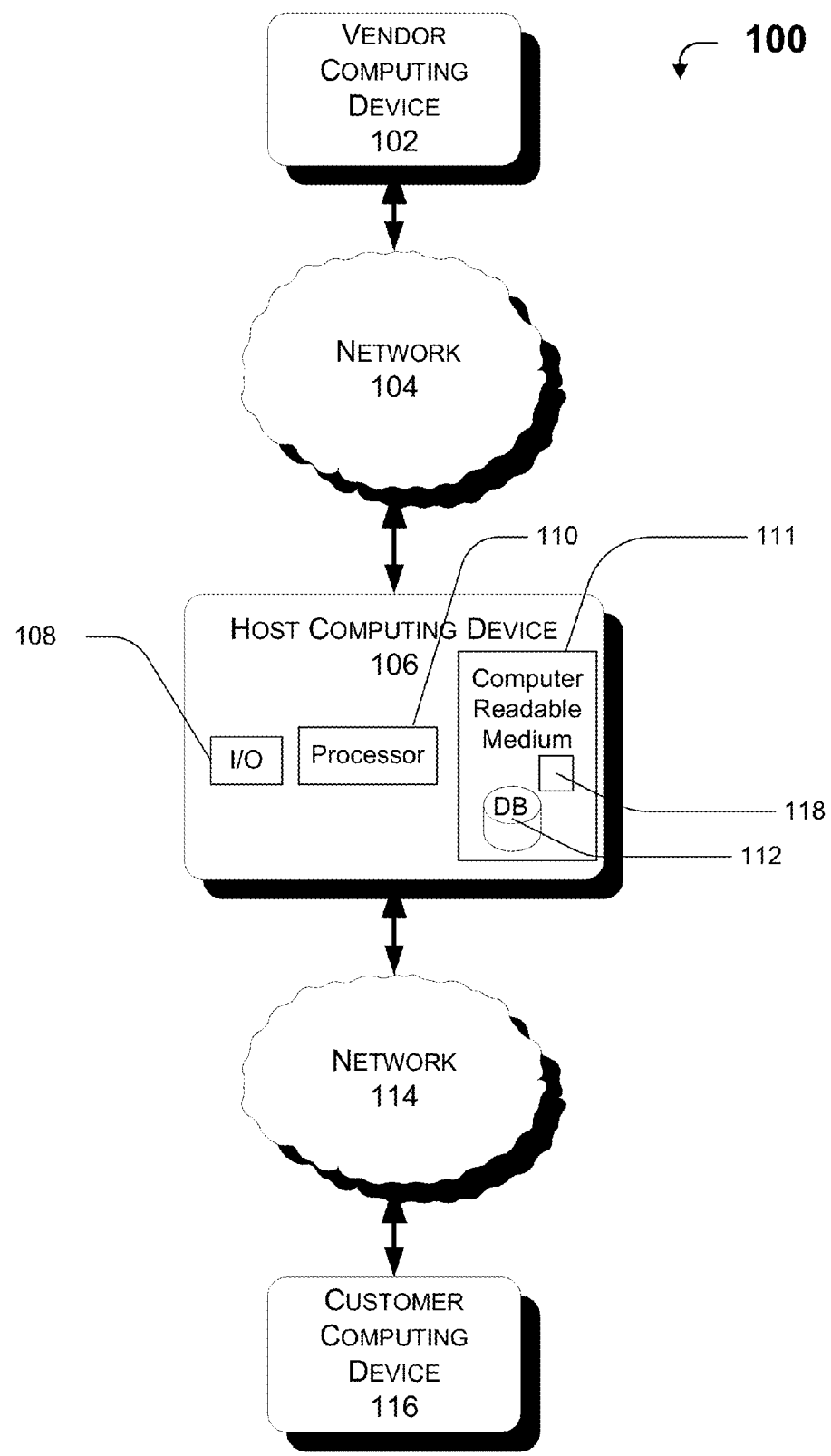
FIG. 1 depicts a block diagram illustrating an exemplary system in which scheduled repetitive searches for a resource may be conducted.

Implementations are described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics may be combined in any suitable manner in one or more embodiments. In the following description, numerous specific details are recited to provide a thorough understanding of embodiments described herein. One skilled in the relevant art will recognize, however, that the implementations described herein may be practiced without one or more of the specific details, or with other methods, components, materials, and so forth. In other instances, well-known structures, materials, or operations are not shown or described in detail to avoid obscuring aspects of the implementations described.

The schematic flow chart diagrams included are generally set forth as a logical flow-chart diagram (e.g., FIGS. 2, 3, 4, 7, 8, and 9). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 2, 3, 4, 7, 8, and 9). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A customer uses a customer computing device to set up an on-line profile with a host computing device. The on-line profile may include data that specifies resources that the customer is interested in purchasing on a repeated schedule. The resource may have a predictable depletion period (e.g., dog food or toner) or a predictable period for providing the resource (e.g., carpet cleaning). For example, the on-line profile may include data about: the good (e.g., brand name, a description of the resource, or a desired quantity); a specified delivery schedule (e.g., every week, every 23 days, every 2 years) for repeat deliveries; a payment account that can be used to make the future purchases; and/or a delivery address for delivery of the purchased resources. The host computing device then conducts searches, on the Internet or within a database, on a preselected chronological schedule. The host computing device may select one or more vendors that are capable of selling the resource to the customer using a vendor selection criterion (e.g., "lowest price"). The host computing device may then query the customer to determine whether to place the order, delay the order, expedite the order, or to forgo the order. Therefore, the host computing device automatically and/or autonomically conducts scheduled repetitive searches for the resources that may be subsequently purchased from any of a plurality of vendors. In one implementation, the resource is purchased from the vendor that is offering the resource for the lowest price (e.g., that may or may not include the shipping costs, handing costs, or taxes). Consequently, the host computing device has the capability to calculate and coordinate: the scheduled repetitive searches, the specified delivery schedule, and the vendor's estimated shipping duration such that the resources are replenished, for example, without the customer running out of the resource.

Referring to FIG. 1, a block diagram illustrates a system 100 for conducted repetitive scheduled searches. The system 100 depicts a host computing device 106 that is communicatively connected to a customer computing device 116 through a first network 114, and to a vendor computing device 102 through a second network 104. Although one consumer computing device 116 and one vendor computing device 102 are shown in FIG. 1, it will be apparent that any number of entities and corresponding devices can be part of the system 100, and further that, while two networks 104 and 114 are shown, any number of networks could also be provided in the system 100.

The vendor computing device 102, the host computing device 106, and the customer computing device 116 may each be an article of manufacture such as a server, a mainframe computer, a mobile telephone, a personal digital assistant, a personal computer, a laptop, an email enabled device, or a web enabled device having one or more processors (e.g., a Central Processing Unit, a Graphical Processing Unit, or a microprocessor) that is configured to execute an algorithm (e.g., a computer readable program code or software) to receive data, transmit data, store data, or performing methods or other special purpose computer. Each computing device may include a non-transitory computer readable medium readable medium having a series of instructions, such as computer readable program steps deposited therein. The non-transitory computer readable medium may include one or more data repositories.

The data repository may be one or more hard disk drives, tape cartridge libraries, optical disks, or any suitable volatile or nonvolatile storage medium, storing one or more databases, or the components thereof, in a single location or in multiple locations, or as an array such as a Direct Access Storage Device (DASD), redundant array of independent disks (RAID), virtualization device, . . . etc. The data repository may be structured by a database model, such as a relational model or a hierarchical model). The computing devices 102, 106, or 116 may include wired and wireless communication devices which can employ various communication protocols including near field (e.g., "Blue Tooth") and far field communication capabilities (e.g., satellite communication or communication to cell sites of a cellular network) that support any number of services such as: Short Message Service (SMS) for text messaging, Multimedia Messaging Service (MMS) for transfer of photographs and videos, or electronic mail (email) access.

The networks 104, 114, or other networks described in this application, may be public or private networks, and may include any of a variety of one or more suitable means for exchanging data, such as: the Internet, an intranet, an extranet, a storage area network (SAN), a wide area network (WAN), a local area network (LAN), a virtual private network, a satellite communications network, an Automatic Teller Machine (ATM) network, an interactive television network, or any combination of the foregoing. The networks may contain either or both wired or wireless connections for the transmission of signals including electrical connections, magnetic connections, or a combination thereof. Examples of these types of connections are known in the art and include: radio frequency connections, optical connections, telephone links, a Digital Subscriber Line, or a cable link. Moreover, networks may utilize any of a variety of communication protocols, such as Transmission Control Protocol/Internet Protocol (TCP/IP), for example.

By way of example, the host computing device 106 is shown as a server, including a processor 110, a non-transitory computer readable medium 111, an input/output means 108 (e.g., a keyboard, a mouse, a stylus and touch screen, or a printer) or, and a data repository DB 112. The processor 110 accesses executable code stored on the non-transitory computer readable medium 111, and executes one or more instructions 118 to, for example, electronically communicate with the consumer computing device 116 or the vendor computing device 102.

To conduct scheduled repetitive searches, the data stored in the DB 112 of the host computing device 106 may include information received from the customer computing device 116 or the vendor computing device 102, or their respective past usage of the system 100.

Referring to FIGS. 2, 3, 4, 7, 8, and 9, flowcharts summarize exemplary methods 200, 300, 400, 700, 800, and 900, respectively, for conducting scheduled repetitive searches for resources for subsequent respective purchases. FIGS. 5, 10, 11, and 12 depict screen shots of exemplary user interfaces that facilitate the execution of the steps of the methods 200, 300, 400, 700, 800, and 900.

Figure 2:
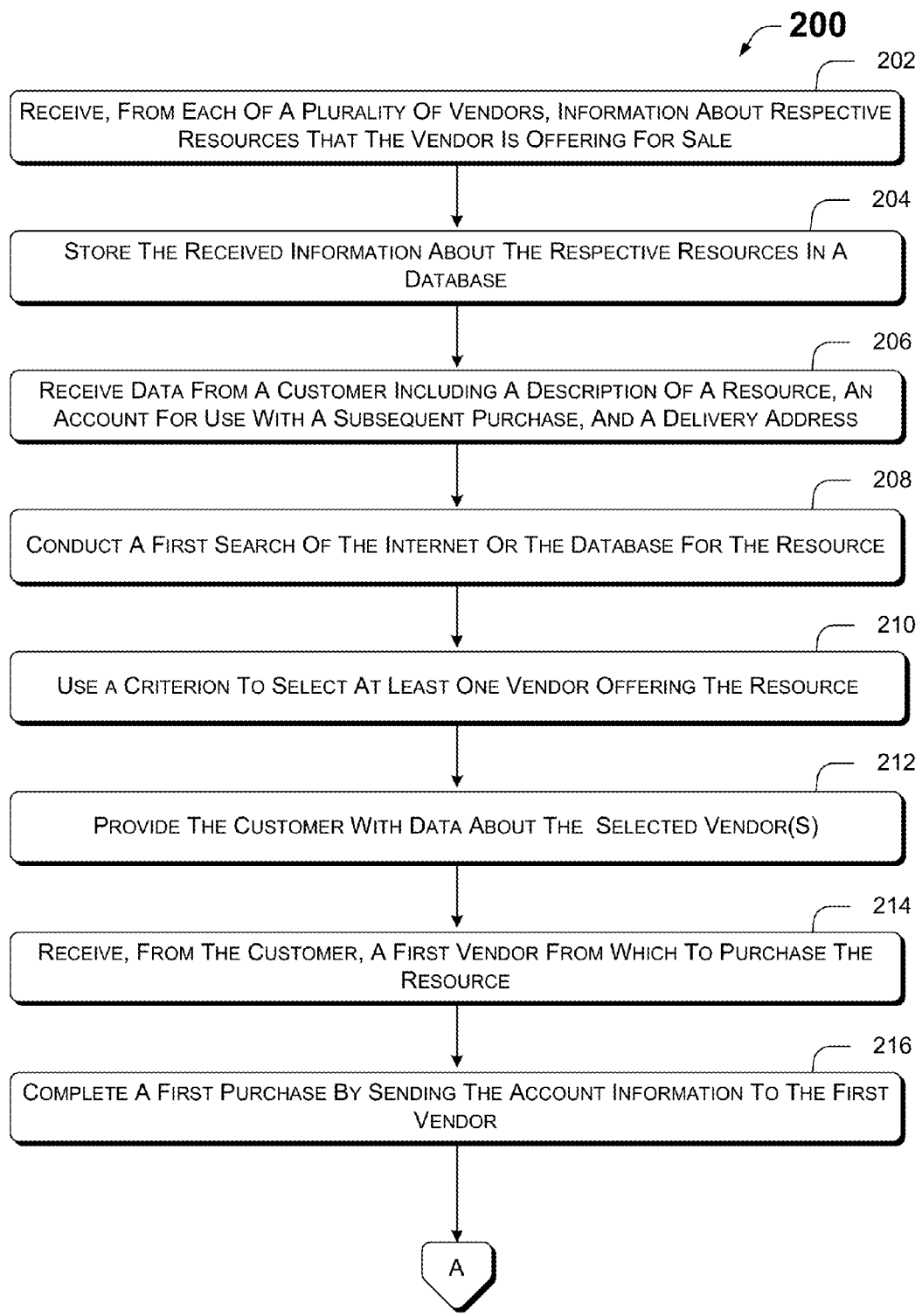
FIG. 2 illustrates a flow chart of an exemplary method for scheduled repetitive searches for a resource.

At a step 202 of FIG. 2, the host computing device 106 optionally receives from each of a plurality of vendors, information about respective resources that the corresponding vendor is offering for sale. The information may include, for example, a description of each resource offered for sale, such as a Stock Keeping Unit (SKU) number, Universal Product Code (UPC), a brand name, a manufacturer name, a make or model of the resource, a quality of the resource (e.g., "make in America," "green product," "locally grown," or other descriptor), a quantity of units within a package of the resource (e.g., 10 pounds, 6 cans), reviews about a quality of the resource (e.g. top rated cereal), a shipping cost for the resource, a shipping cost for a group of resources, or an estimated shipping duration (e.g. 5 business days for ground transportation). At a step 204, the host computing device 106 optionally stores the received information about the respective resources in the DB 112.

At a step 206, the host computing device 106 receives data from a customer. For example, the customer may use the customer computing device 116 to connect to the Internet and access an interactive website associated with the host computing device 106. The customer may create a customer profile by entering data about the customer into fields rendered by the interactive website upon the customer computing device 116. The data may include: a name of the customer; an account identifier of the customer usable to make a future purchase (e.g., checking account number, a credit account number, a charge card account number, an electronic wire transfer account number); a delivery address for the customer (e.g. residential address); a description of the resource the customer is interested in purchasing, such as a data identifying the resource (e.g., a brand, a manufacturer name, a SKU number, or a UPC); a quantity of the resource the customer wishes to purchase, or a specified delivery schedule. To illustrate, the customer may log on to the interactive website and, as depicted by the User Interface 500 in FIG. 5, identify the resource at 502 as "Alpo Prime Cuts Dog Food, 10 pound bag." In one implementation, the interactive website may provide a listing of resources available for purchase in each of a plurality of categories for ease of selection.

The customer may also specify a specified delivery schedule for recurring delivery of a resource. As illustrated in User Interface 504, the customer may enter a duration of time that the customer would like to lapse between the delivery of the first Alpo® Prime Cuts Dog Food and a subsequent delivery of the Alpo® Prime Cuts Dog Food. Here, the customer has indicated at element 506 that the customer would like a two-week window between deliveries. Other windows of time are also applicable such as one month, 23 days, one year . . . etc.

At a step 208, the host computing device 106 conducts an electronic search for vendors selling the resource described in the step 206. For example, the host computing device 106 may conduct a search for vendors offering to sell "Alpo Prime Cuts Dog Food" using an Internet search engine. For example, the host computing device 106 can match data identifying the resource with a description of resources offered for sale by a plurality of vendors. Alternatively or in combination, the host computing device 106 may conduct a search of the DB 112 to find the vendor(s) offering to sell the resource described in the step 206.

At a step 210, the host computing device 106 uses a vendor selection criterion to select at least one vendor offering the resource for sale. The vendor selection criterion may be, for example, the vendor having the lowest price for the resource (e.g., cost of the resource or the cost of the resource plus fees for shipping or handling of the resource in association with a purchase of the resource). Alternatively, or in combination, the vendor selection criterion can be the vendor offering the resource that: is made in a specified country (e.g., "made in America"); was grown within geographic proximity to the delivery address of the customer; or having the best resource review, for example. The vendor selection criterion can reflect other characteristic of the resource that the customer priorities for purchase, or combinations thereof. If the vendor selection criterion includes more than one characteristic of the desired resource, the customer may rank which characteristics take higher precedence than other characteristics.

At a step 212, the host computing device 106 provides the customer with data about the selected vendor(s) selected in the step 210. For example, an interactive website may be rendered upon the customer computing device 116 showing a ranked listing of the vendors based on the vendor selection criterion such as "The Alpo Dog Food may be purchased from each of the following: Walgreens $50; Wal-Mart $45; or Safeway $20." If the search criterion includes more than one ranked characteristic then the vendor is selected by formulaic rules that substantially effectuate the preferred ranking of the customer, such as through a weighting system. To illustrate, if the customer ranks "made in America" higher than "lowest cost," then the formulaic rule may weigh vendors with resources that are "made in America" higher than vendors that have the "lowest cost" for the resource. IA selection of the vendors is displayed to the customer via a user interface.

At a step 214, the host computing device 106 receives from the customer computing device 116, data about a first vendor from which the customer has selected to purchase the resource. In the above example, the customer may select "Safeway." At a step 216, the host computing device 106 completes a first purchase of the resource by sending the payment account information of the customer to the first vendor selected at the step 214. Here, method 200 moves from step 216 to step 302 via the cross reference "A" in FIG. 2 to FIG. 3.

Figure 3:
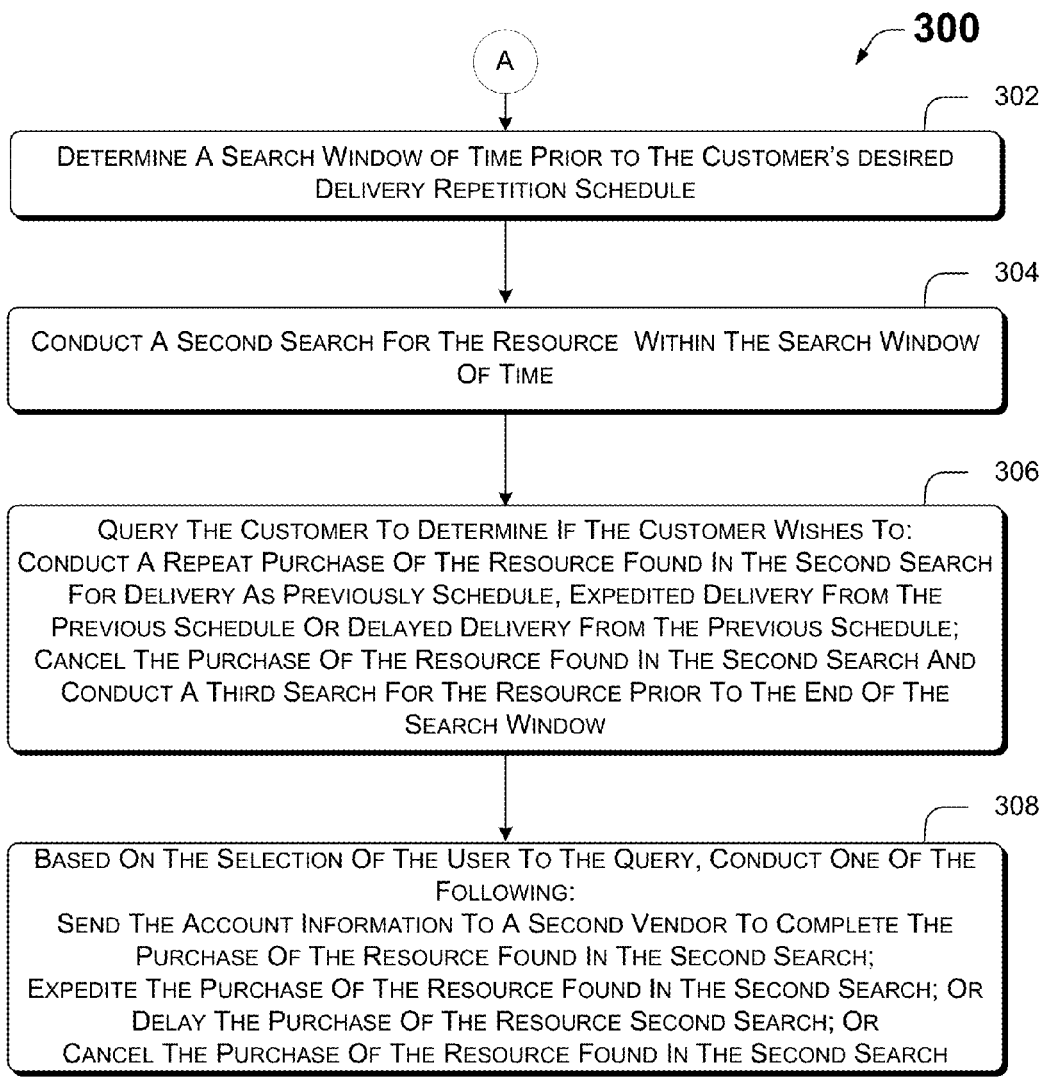
FIG. 3 illustrates a flow chart continuing the method of FIG. 2.

Referring to FIG. 3, at the step 302, the host computing device 106 calculates a search window of time matching the customer's specified delivery schedule. For example, if the customer indicated at the step 206 that the customer would like the time lapse between the first and second delivery of the resource to be 2 weeks, then the search window of time may be one week prior to the second delivery date. Here, the search is conducted one week prior to the second delivery date to give time, for example, for shipping of the resource.

Figure 6:
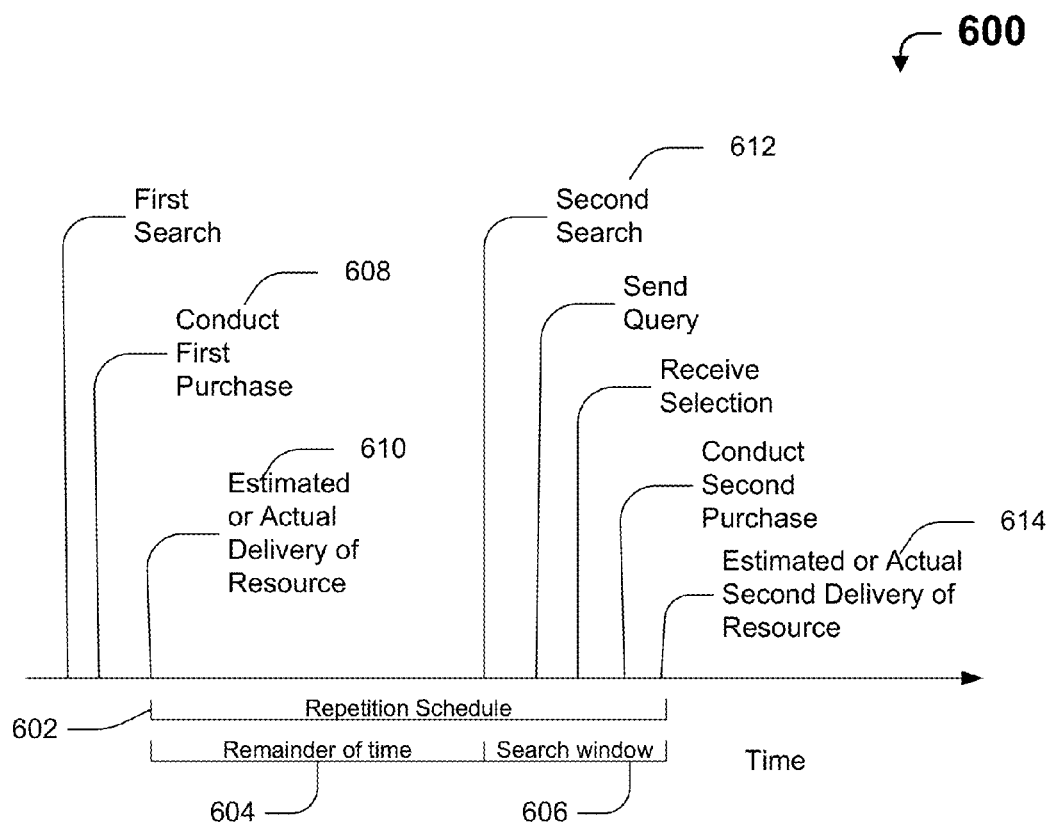
FIG. 6 illustrates an exemplary timeline for the scheduled repetitive searches for a resource.

FIG. 6 depicts a chronology of the searches and respective deliveries of the resource may be depicted in a timeline. A timeline 600 illustrates a period of time that represents the customer's specified delivery schedule 602. Stated another way, the period of time 602 is an amount of time between two consecutive deliveries of the resource, each bought from respective vendors. The period of time 604 is a time period between an estimated or actual first delivery of the resource and a subsequent search for a vendor selling the resource for a second purchase. A search window 606 depicts a duration of time prior to an estimated second delivery. Here, the host computing device 106 automatically (e.g., with minimal human intervention) and/or autonomically (e.g., in a self-regulating manner) conducts a prescheduled search for a vendor selling the resource during the search window 606. To illustrate, the customer's specified delivery schedule may be every 30 days. The period of time 604 may be 20 days and the search window 606 may be 10 days. Therefore, here, the search or searches for the vendors selling the resource may be conducted anytime during the 10 days prior to the estimated or actual second delivery of the resource 614.

In one implementation, the host computing device 106 calculates a date to conduct a second search 612 for vendors selling the research based on the preselected search window 606, a date of the first purchase 608, an estimated or actual first delivery of the resource 610, and the customer's specified delivery schedule 602. To illustrate, a customer may request monthly delivery of a resource (step 206). The host computing device 106 may select a first vendor from which to buy the resource (step 210) and conduct a first purchase 608 of the resource (step 216). For example, the first purchase 608 date may be Jun. 1, 2009. The host computing device 106 may search the DB 112 to determine the first vendor's estimated shipping duration, for example 5 days from the date of the first purchase 608. Therefore, a first estimated delivery of the resource 610 is estimated to occur on Jun. 5, 2009, in this example.

Alternatively, or in combination, the host computing device 106 may receive data about an actual delivery date. For example, the host computing device 106 may receive shipping information from the shipper shipping the resource purchased from the first vendor, or the first vendor itself, such as a tracking number for the shipment of the resource purchased from the first vendor. The host computing device 106 may use the tracking number to check and confirm the actual shipping date of the resource purchased from the first vendor. Alternatively, or in combination, the first vendor may transmit a delivery confirmation including the actual date of delivery of the resource purchased from the first vendor. In the above example, the first vendor may send a confirmation to the host computing device 106 that the resource was delivered to the customer's address on Jun. 5, 2009.

Given that the customer's specified delivery schedule 602 is every 30 days in the above example, the host computing device 106 determines that an estimated second delivery of the resource 614 should be on Jul. 5, 2009 (e.g., 30 days from Jun. 5, 2009). Assuming a 10 day preselected search window 506, the host computing device 106 schedules to automatically and/or autonomically conduct the second search 612 between Jun. 25, 2009 and Jul. 5, 2009. In another implementation the preselected search window 606 has an upper and a lower limit. For example, the search window 606 may be a period of time between 10 to 5 days prior to the estimated second delivery of the resource 514. Here, the search is done in time to accommodate a five day delivery period for the second delivery 514.

Referring back to FIG. 3 and FIG. 6, at a step 304, the host computing device 106 conducts a second search for the resource within the search window 606. In the above example, the host computing device 106 may automatically and/or autonomically conduct a preset search for the resource on Jun. 30, 2009. Here again, the host computing device 106 selects a list of vendors that meet the vendor selection criterion. The second list of vendors, however, may be different from the first list of selected vendors found in the step 210. Therefore, the first purchase for the resource may be with a first vendor while the second purchase is with a second vendor that is different from the first vendor.

At a step 306, the host computing device 106 sends a transmission to the customer, such as sending a transmission to the customer computing device 116 (e.g., a laptop computer used in the step 206) or a second of the customer computing devices 116 of the customer (e.g., a cell phone not used in the step 206). The transmission includes a query to determine if the customer wishes to conduct a repeat purchase of the resource found in the second search 512. For example, the host computing device 106 may send a SMS message to the customer computing device 116 indicating: "Ms. Mary Smith, your next order of Kotex Maxi Pads 24 pack is due to arrive in 5 days. This automatic and/or authonomic purchase will be at the guaranteed lowest current price on the web and requires no action on your part, unless you wish to SPEED UP, SLOW DOWN, SUSPEND, OR CANCEL the delivery." The "SPEED UP" and "SLOW DOWN" "SUSPEND," or "CANCEL" options of the message may feature drop down boxes or entry fields where new delivery dates can be selected if desired. This extra feature prevents Mary Smith from ever overstocking or feeling locked in to future purchases. Mary Smith may select to conduct the second purchase. Alternatively, Mary Smith may select to expedite the delivery of the resource (deliver the resource on July 1st rather than July 5th in the above example) or delay the delivery (deliver the resource on July 10th rather than July 5th in the above example). Alternatively, the customer may select to cancel the delivery of the resource found in the second search and conduct a third search for the resource for delivery at the specified delivery schedule (Jul. 5, 2009). Alternatively, the customer may select to cancel the second delivery all together (no delivery of the resource until the subsequent 30 days after Jul.

5, 2009). Other changes to the specified delivery schedule are also contemplated as would be apparent to those of ordinary skill in the art.

If the customer's selection affects the vendor selection criterion a new ranked list may be presented to the customer. For example, if the customer selects to expedite the second delivery of the resource, extra shipping and handling costs may come into affect, Here, the host computing device 106 may recalculate the costs for each of the vendors in the list of selected vendors. The host computing device 106 may then facilitate the rendering of the new list of selected vendors on the customer computing device 116. Alternatively, or in combination, the host computing device 106 may repeat the second search of the step 304 for the new delivery date.

In another implementation, the customer receives the query prior to the second search (the step 306 occurs before the step 304). Here, the customer may select to cancel the order and the host computing device 106 does not proceed to the step 304 to conduct the second search.

At a step 308, the host computing device 106 conducts the requested action of the customer from step 306. For example, the host computing device 106 may complete the second purchase with the second vendor for delivery as denoted by the customer in the step 304. If the delivery is expedited, extra shipping costs may be paid to the vendor for timely delivery. If the delivery is delayed, the order for the resource may be placed at a later date in order for the second delivery to be on the specified delayed date. Alternatively, or in combination, the host computing device 106 may transmit to the second vendor the change to the second delivery date.

In another implementation, the host computing device 106 automatically and/or autonomically selects the first vendor or second vendor without providing information about the selected vendors to the customer (e.g., steps 212 or 214 of FIG. 2 or step 308 of FIG. 3). For example, the host computing device 106 selects the vendor offering the cheapest price for the resource without further communicating with the customer.

Figure 4:
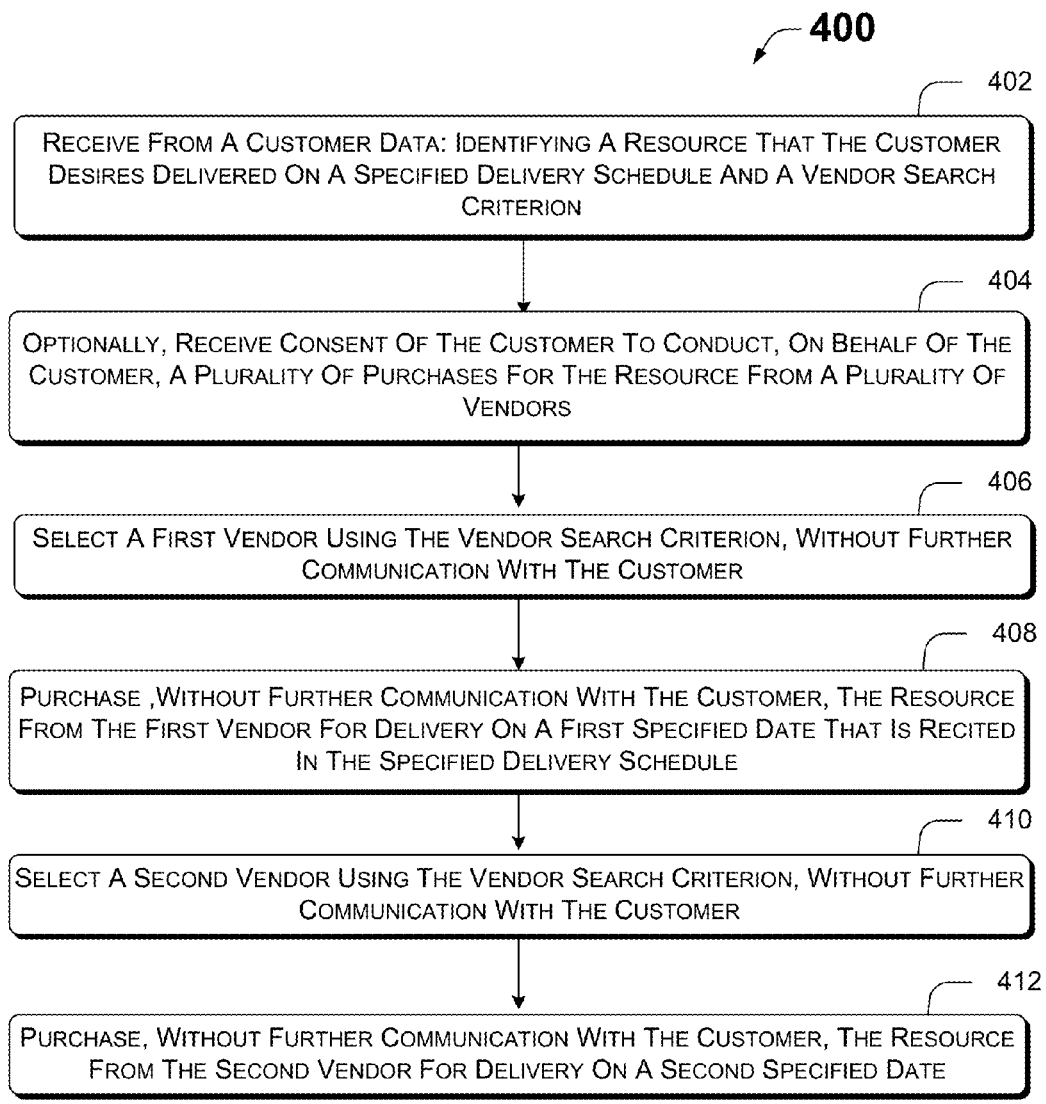
FIG. 4 illustrates a flow chart of an exemplary method for scheduled repetitive, autonomic searches for a resource.

Referring to FIG. 4, a flow chart summarizes an implementation of a method 400 for automatically and/or autonomically conducting scheduled repetitive searches for the resource or resources. At a step 402, data is received from the customer identifying a resource that the customer desires delivered to an address on a specified delivery schedule. For example, the customer may identify "toothpaste" or "COLGATE brand toothpaste" in a search query box of a world wide web user interface. Further at step 402, a vendor selection criterion is received from the customer. As previously stated, the vendor selection criterion may be "the cheapest price," "made in America," "vegan goods," "recycled material," other characteristic that reflects the desired resource selection priority of the customer, or combinations thereof. The vendor selection criterion can be preset to a default characteristic, such as "lowest price," such that the customer need not send a vendor selection criterion in step 402.

In some implementations, as shown at step 404, a consent of the customer is received. The consent allows for a plurality of purchases to occur, on behalf of the customer, for the resource from a plurality of vendors without further consent or authorization of the customer. For example, a consent of the customer can include payment information, such as an identifier of a payment account and a corresponding expiration date, along with approval for the host computing device 106 to submit the payment information to vendors to effectuate a purchase for the resource. The payment information may be stored in the data repository DB 112 and retrieved for the future purchases.

At step 406, a first vendor is selected using the vendor selection criterion without further communication with the customer. Here, the customer is not queried for further information or instruction. Rather, the first vendor is selected autonomically, without further intervention by the customer. Moreover, at step 406, the resource is purchased from the first vendor for delivery on the first specified date, without further communication with the customer.

To illustrate, at step 402, on Apr. 1, 2000, the customer may have used the customer computing device 116 to transmit, via the network 114 to the host computing device 106, a request that toothpaste be delivered to a specified residential address every four weeks beginning on Apr. 10, 2000. On Apr. 5, 2000, the host computing device 116 autonomically, without communicating with the customer, searches the Internet for vendors offering to sell the resource. The host computing device 116 uses the vendor selection criterion to select the first vendor that (1) is offering the resource for sale and (2) satisfies the vendor selection criterion. The host computing device 116 effectuates the purchase of the resource from the first vendor by submitting the payment information to the first vendor and accepting the vendor's offer of sale of the resource, on behalf of the customer. The host computing device 116 can transmit the payment information to the first vendor, without the host computing device 116 communicating with the customer.

At a subsequent time, a second search is conducted to select a second vendor offering to sell the resource. At step 410 the vendor selection criterion is used to select the second vendor offering to sell the resource. The second vendor may be different or the same as the first vendor. At step 412, the resource is purchased from the second vendor for delivery on a second specified date. As previously stated, the second specified date is determined from the specified delivery schedule. Here, the purchase of the resource from the second vendor occurs without further communication with the customer. In the above example, the host computing device 106 can autonomically conduct a second search on the Internet on Apr. 25, 2000 for a second vendor offering to sell the resource. The host computing device 106 autonomically uses the vendor selection criterion to select the second vendor and effectuate the purchase of the resource from the second vendor without querying the customer for data or instruction.

Figure 7:
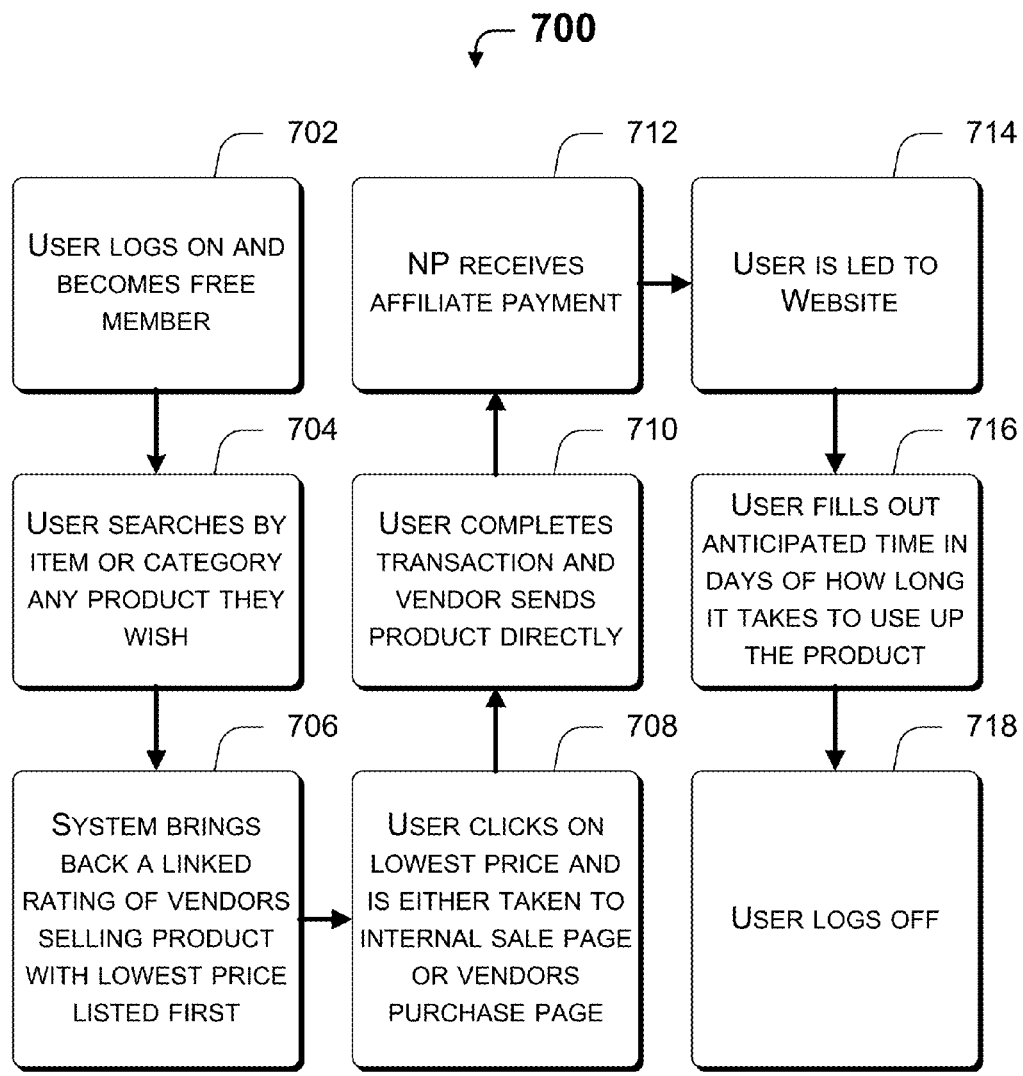
FIG. 7 illustrates a flow chart of another exemplary method for scheduled repetitive searches for a resource.
Figure 8:
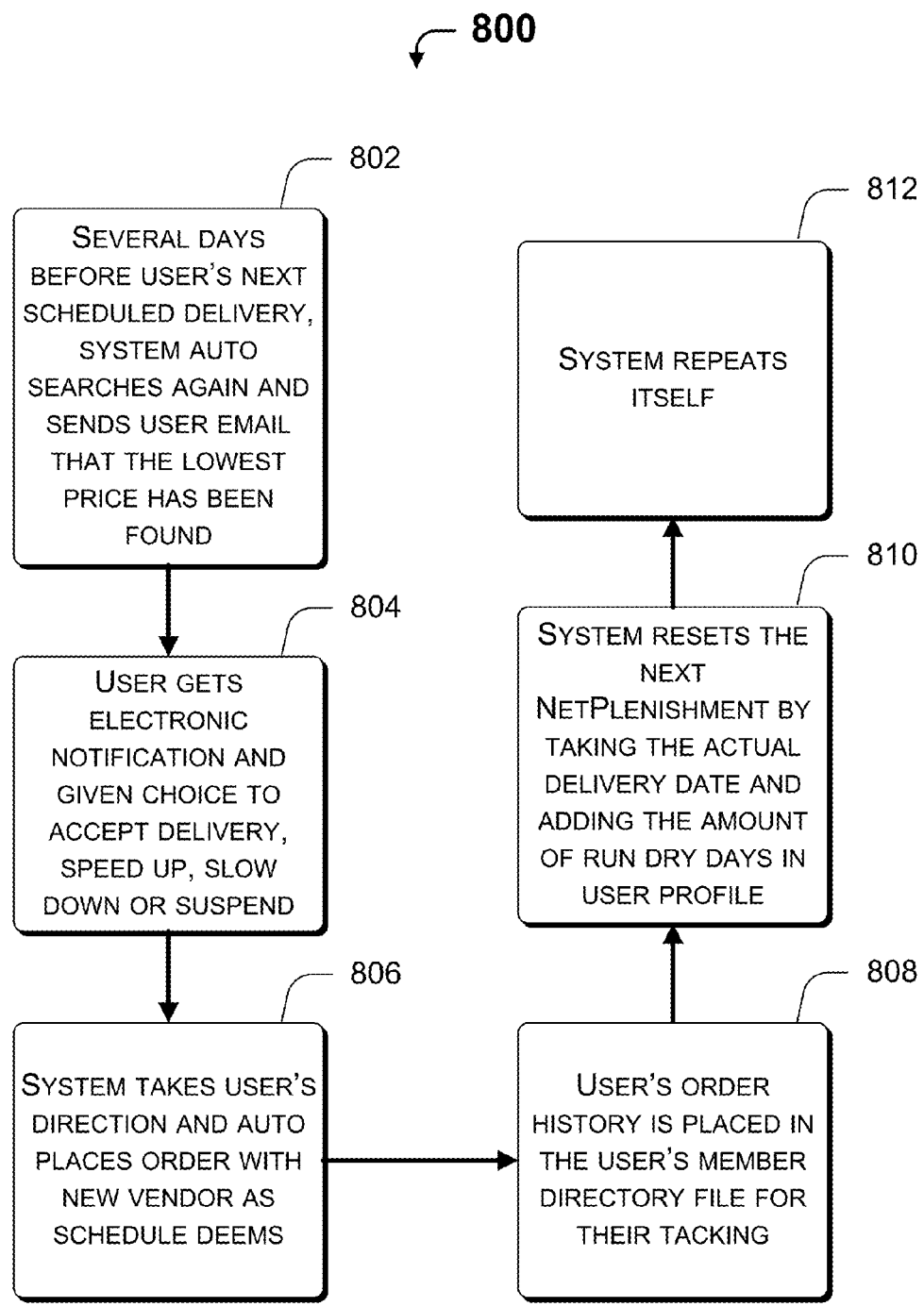
FIG. 8 illustrates a flow chart continuing the method of FIG. 7.

Referring to FIGS. 7 and 8, flow charts summarize another implementation for automatically and/or autonomically conducting scheduled repetitive searches for the resources by the methods 700 and 800, respectively. At a step 702, the user (e.g. customer) logs on and becomes a free member of the system 100. Here, as previously described, the user may send to the host computing device 106 data about the resource that the user wants to repeatedly purchase or data about credit card information for a payment account of the user to use to make subsequent purchases. At a step 704, the user searches for a resource by category or product. At a step 706, the host computing device 106 brings back linked ranking of vendors selling the product with the lowest price listed first. At a step 708, the user clicks on the lowest price and is taken to either the vendor's purchase webpage or to a webpage associated with the host computing device 106, for example. At a step 710, the user completes the transaction and the vendor sends the product directly to the address of the customer. At a step 712, the host ("NP") receives an affiliate payment, such as a fee from each of the vendors listed on the ranked list or a fee from the vendor selected by the user. At a step 714, the user is led to a webpage, such as the vendor's web page or to a web page associated with the host computing device 106. At a step 616, the user fills out anticipated time in days or weeks, for example, of how long it takes to use up the product. At a step 718, the user logs off of the host's website. The method 700 then continues to step 802 of method 800 of FIG. 8.

Referring to FIG. 8, at a step 802, several days before the user's next scheduled delivery, the host computing device 106 auto searches again and sends the user an electronic notification (e.g., MMS message), that the lowest price has been found. At a step 804, the user gets the electronic notification and responds by selecting to accept delivery, speed up delivery, slow down or suspend the delivery. A default setting may be if the user does not respond to the email sent in the step 802, to automatically and/or autonomously place the order for the resource for delivery to the customer at the specified delivery schedule. At a step 806, the host computing device 106 takes action on the user's selection in step 804 and auto places the order with a new vendor as schedule deems. At a step 808, the user's order history is placed in the user's member directory file for tracking purposes. At a step 810, the system resets the next repeated search by taking the actual delivery date and adding the amount of run dry days (based on the customer's specified delivery schedule 502) in the user profile. At a step 812, the system 200 repeats the steps of searching, alerting the user, and completing the subsequent purchase. In some implementations, the user is not sent an email about the resource and the purchase is completed automatically and/or autonomously.

Figure 9:
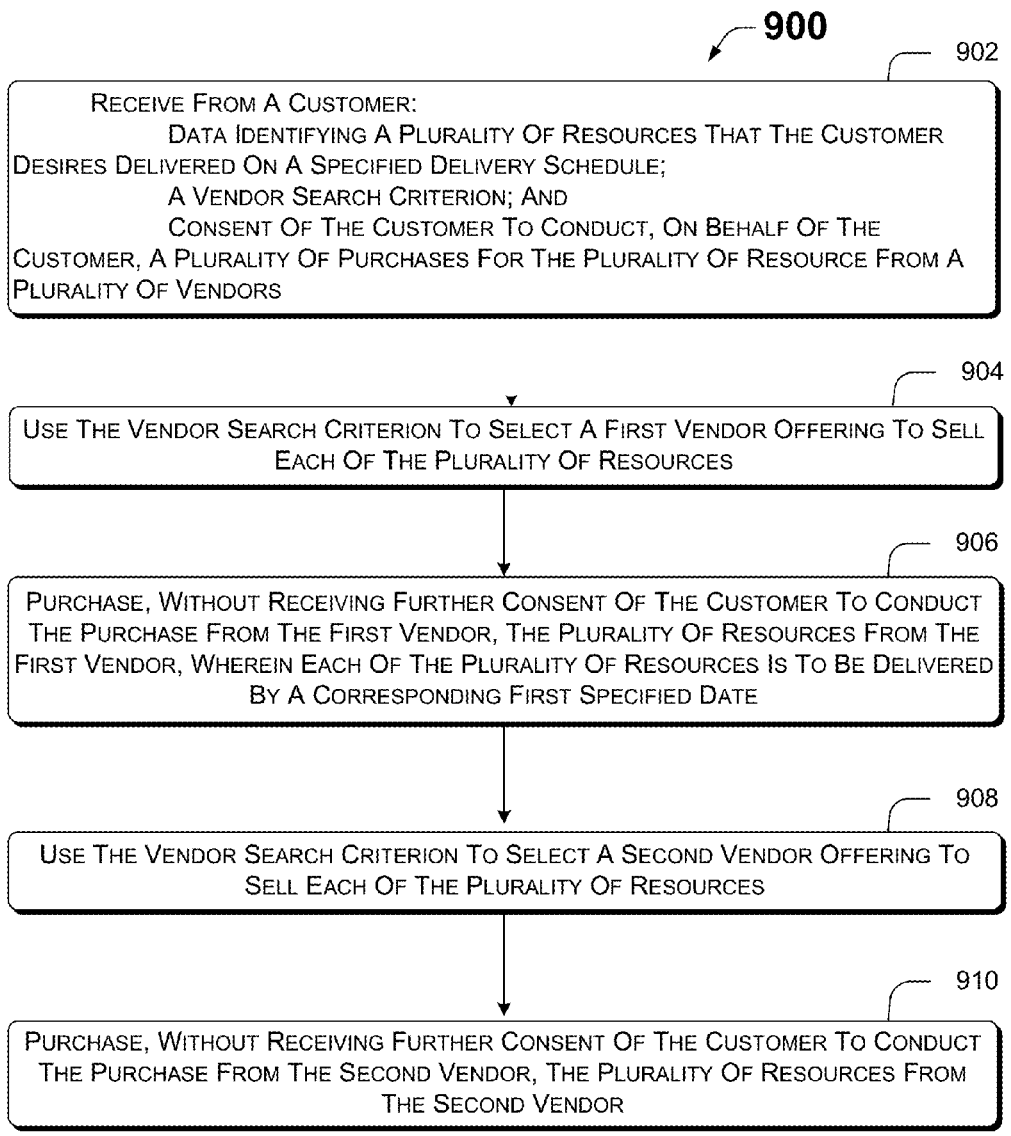
FIG. 9 illustrates a flow chart of an exemplary method for scheduled repetitive, autonomic searches for a plurality of resources.
Figure 10:
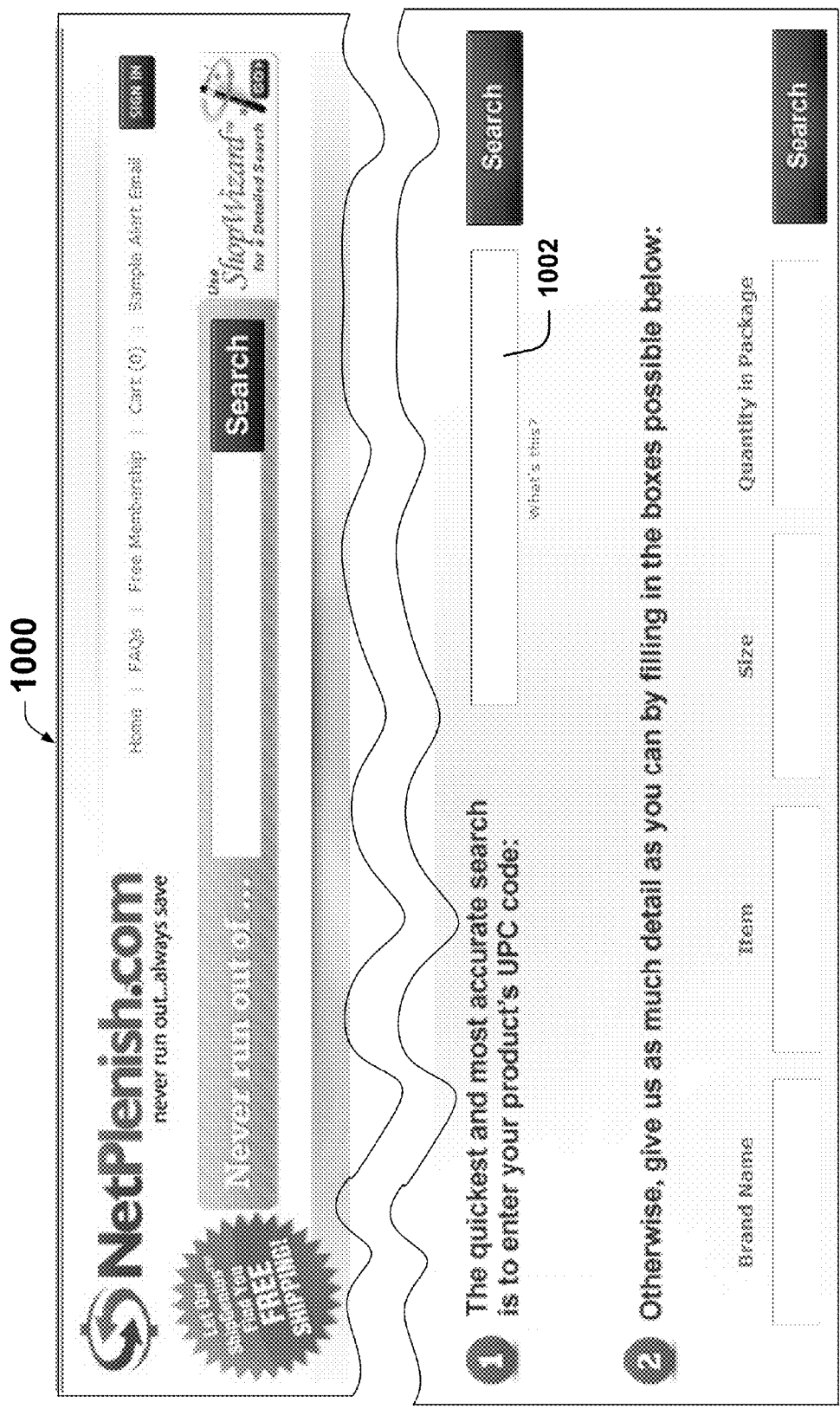
FIG. 10 illustrates a user interface rendered on a customer computing device in the system depicted in FIG. 1.
Figure 12:
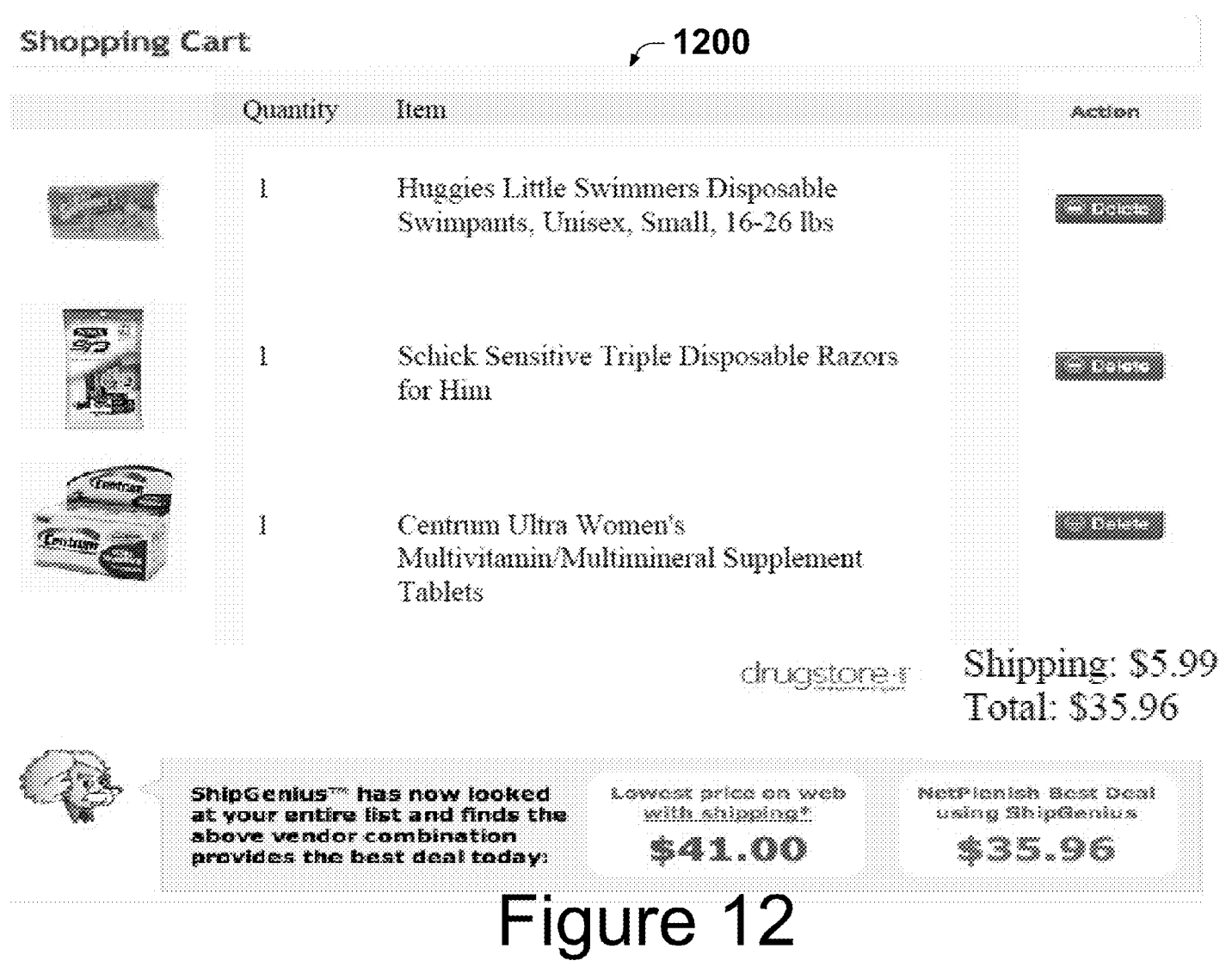

In another implementation, the customer selects more than one resource for delivery to a specified address. Referring to FIGS. 9-12, a flow chart in FIG. 9 depicts a method 900 for automatically and/or autonomously conducting scheduled repetitive searches for a plurality of resources and FIGS. 10-12 depict exemplary screen shots of corresponding user interfaces. At a step 902 of FIG. 9, information is received from a customer. The information includes data identifying a plurality of resources that the customer desires delivered on a specified delivery schedule, a vendor selection criterion, and consent of the customer to conduct, on behalf of the customer, purchases for resources from a plurality of vendors. For example, the customer may enter, in succession, each of 3 UPC codes in a search term in a query box 1002 of FIG. 10. The select 3 UPC codes may be, for example, for Disposable Swimpants; (2) Razors; and (3) Multivitamins.

At the step 904, the host computing device 106 uses the vendor selection criterion to select at least one vendor offering all the resources. For example, the vendor selection criterion may be the lowest aggregate cost for purchasing and shipping the 3 resources to the address designated by the customer. The aggregate cost for the purchase of all 3 resources from each vendor can, in turn, be determined.

The tables below illustrate two exemplary processes for determining the aggregate cost for the purchase of all 3 resources from each of a plurality of vendors. The first three tables show ranking of the vendors if only a single resource was being purchased from each vendor (e.g., step 406 of FIG. 4). The vendors may each operate business in a corresponding currency. The currency of the vendors may be converted to a single currency for ease of comparison and ranking. Here, the ranking is based on the currency exchange rate of: $US.62=£1.00 and $US1.02=$CA1.00.

TABLE 1

| Resource | Vendor | Price (with individual shipping) | Rank Based on Price of Individual Resource |
|---|---|---|---|
| Disposable Swimpants | Vendor 1 | $US10.00 | 1 |
| Disposable Swimpants | Vendor 2 | £7.50 | 3 |
| Disposable Swimpants | Vendor 3 | $CA12.00 | 2 |
| Disposable Swimpants | Vendor 4 | $US15.80 | 4 |

TABLE 2

| Resource | Vendor | Price (with individual shipping) | Rank Based on Price of Individual Resource |
|---|---|---|---|
| Razor | Vendor 1 | $US9.80 | 3 |
| Razor | Vendor 2 | £2.30 | 1 |
| Razor | Vendor 3 | $CA8.00 | 2 |
| Razor | Vendor 4 | $US10.80 | 4 |

TABLE 3

| Resource | Vendor | Price (with individual shipping) | Rank Based on Price of Individual Resource |
|---|---|---|---|
| Multivitamin | Vendor 1 | $US10.00 | 4 |
| Multivitamin | Vendor 2 | £1.80 | 1 |
| Multivitamin | Vendor 3 | $CA7.00 | 2 |
| Multivitamin | Vendor 4 | $US8.80 | 3 |

In one implementation, the lowest aggregate cost for purchasing all 3 resources may be an arithmetic combination of the individual price.

TABLE 4

| Resource | Vendor | Aggregate Cost (with individual shipping) | Rank Based on The Aggregate Price of All Resources |
|---|---|---|---|
| Disposable Swimpants Razors Multivitamins | Vendor 1 | $US29.80 | 3 |
| Disposable Swimpants Razors Multivitamins | Vendor 2 | £11.60 | 1 |
| Disposable Swimpants Razors Multivitamins | Vendor 3 | $CA27.00 | 2 |
| Disposable Swimpants Razors Multivitamins | Vendor 4 | $US35.40 | 4 |

In the above example in Table 4, the host computing device 106 would select Vendor 2 because Vendor 2 offers the lowest aggregate cost for the purchase of all 3 recourses (£11.60).

In another implementation the aggregate cost can include the individual price for each of the three resources less any savings that may apply for purchasing all 3 resources from the corresponding vendor. For example, a savings may apply for: shipped all three resources in one shipment ("bulk shipping discount") instead of having each resource individually delivered; the vendor may offer a discount for bulk purchases whether or not the resources are individually delivered; a manufacturer may offer a rebate for purchasing multiple resources together that have a similar brand; or other applicable discounts. The following table illustrates aggregate costs based on individual prices of the resources less savings due to bulk shipment.

| Resource | Vendor | Aggregate Cost (with a single shipping for all three resources) | Rank Based on The Aggregate Price of All Resources |
| --- | --- | --- | --- |
| Disposable Swimpants Razors Multivitamins | Vendor 1 | $US17.80 | 2 |
| Disposable Swimpants Razors Multivitamins | Vendor 2 | £11.60 | 4 |
| Disposable Swimpants Razors Multivitamins | Vendor 3 | $CA19.00 | 3 |
| Disposable Swimpants Razors Multivitamins | Vendor 4 | $US16.00 | 1 |

The application of the savings based on shipping all three resources together results in a different aggregate cost than the aggregate cost that includes individual shipping. Here, the host computing device 106 would select Vendor 4 because Vendor 4 offers the lowest aggregate cost ($US16.00) for the purchase of all 3 recourses.

Referring back to FIG. 9, step 904 may include subsets, such as, determining a vendor with the lowest price for an individual resource and keeping track of other vendors that offer the individual resource for sale but may not have the lowest price for the individual price. FIG. 11 shows an exemplary screen shot of a user interface 1100 in which information about offers from corresponding vendors for at least one of the resources is tracked and displayed, such as vendor DrugStore.com 1102 and vendor Vitaminemporium.com 1104. Once a plurality of resources have been examined, the host computing device 105 can group resources together in order to determine if any savings may apply for an aggregate purchase of the resources from a single vendor. In FIG. 11, vendor DrugStore.com 1102 offers all three resources for sale while vendor Vitaminemporium.com 1104 only offers two of the three resources for sale. Accordingly, vendor DrugStore.com 1102 is the vendor that offers all three resources for the lowest aggregate cost 1108 ($35.96). FIG. 12 provides an exemplary screen shot of a user interface 1200 displaying the selected vendor.

Referring back to FIG. 9, at step 906, the resources are purchased from the selected first vendor without receiving further consent of the customer to conduct the purchase from the first vendor. The host computing device 106 may then complete the first purchase by sending the payment account information of the customer to the vendor with the lowest aggregate cost. Here, if the resources are being shipped together, each of the resources will have the same first specified date for delivery of the resources. Alternatively, if one or more of the resources is being shipped separately, then the one or more of the resources will have a corresponding first specified date that is different from the first specified date of delivery for the other resources.

The host computing device 106 then conducts a second subsequent search for the resources described in step 902 for delivery at a subsequent date that conforms to the specified delivery schedule of the customer. At step 904, the host computing device 106 uses the vendor search criterion to select a second vendor offering to sell each of the plurality of resources to replenish the resources. Here again, the host computing device 106 may determine if any savings may apply for purchasing more than one resource from a single vendor. At step 910, the resources are purchased from the second vendor without receiving further consent of the customer to conduct the purchase from the second vendor.

Here again, if the resources are being shipped together, each of the resources will have the same first specified date for delivery of the resources. Alternatively, if one or more of the resources is being shipped separately, then the one or more of the resources will have a corresponding second specified date that is different from the second specified date of delivery for the other resources.

It should be understood that the present invention can be implemented in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods to implement the present invention.

In certain embodiments, an article of manufacture, such as and without limitation computing device 106, comprises instructions, such as instructions 118 (FIG. 1) encoded in a non-transitory computer readable medium 111 (FIG. 1) wherein those instructions are executed by a processor, such as processor 110 (FIG. 1) to perform one or more of steps recited in one or more of FIGS. 2, 3, 4, 7, 8, and 9.

In other embodiments, instructions reside in any other computer program product, where those instructions are executed by a computer external to, or internal to, system 100 (FIG. 1), to perform one or more of steps recited in FIGS. 2, 3, 4, 7, 8, and 9. In either case, the instructions may be encoded in computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. An article of manufacture comprising a processor and a non-transitory computer readable medium having computer readable program code disposed therein to autonomically purchase a resource from a plurality of vendors in accord with a specified delivery schedule, the computer readable program code comprising a series of computer readable program steps to effect:

receiving from a customer:

data identifying a plurality of resources that the customer desires;

a specified delivery schedule for each of the plurality of resources;

a vendor selection criterion; and consent of the customer to conduct, on behalf of the customer, a plurality of purchases for the plurality of resources from a plurality of vendors;

using the vendor selection criterion to select a first vendor from which to purchase each of the plurality of resources;

purchasing, without receiving further consent of the customer to conduct the purchase from the first vendor, the plurality of resources from the first vendor, wherein each of the plurality of resources is to be delivered by a corresponding first specified date;

using the vendor selection criterion to select a second vendor from which to purchase each of the plurality of resources; and purchasing, without receiving further consent of the customer to conduct the purchase from the second vendor, the plurality of resources from the second vendor, wherein:

each of the plurality of resources purchased from the second vendor is to be delivered by a corresponding second specified date;

each of the first specified dates is earlier than a corresponding second specified date;

each of the first specified dates is recited in the specified delivery schedule;

each of the second specified dates is determined from, at least, the specified delivery schedule;

using the vendor selection criterion to select the first vendor or the second vendor includes determining for each said vendor an aggregate cost to purchase the plurality of resources from the one said vendor, the aggregate cost including an individual price for each of the resources less any applicable vendor discount;

the applicable discount comprising at least one member of the group consisting of a bulk shipping discount, a discount for bulk purchases, and a rebate; and the first vendor differs from the second vendor.

2. The article of manufacture as defined in claim 1, wherein each of the plurality of resources is to be delivered by a same first specified date.

3. The article of manufacture as defined in claim 1, wherein each of the plurality of resources is to be delivered by a same second specified date.

4. The article of manufacture as defined in claim 1, wherein the aggregate cost includes an individual price for each of the resources less any savings that may apply for purchasing all of the plurality of resources from the one said vendor; and wherein using the vendor selection criterion to select the first vendor includes selecting the lowest aggregate cost from among the corresponding aggregate costs for each vendor.

5. The article of manufacture as defined in claim 4, wherein the savings includes a bulk shipping discount for shipping all of the resources together in one shipment.

\* \* \* \* \*